United States Patent
Issa et al.

(10) Patent No.: US 8,265,658 B2
(45) Date of Patent: Sep. 11, 2012

(54) SYSTEM AND METHOD FOR AUTOMATED LOCATION-BASED WIDGETS

(75) Inventors: Alfredo C. Issa, Apex, NC (US); Kunal Kandekar, Jersey City, NY (US); Scott Curtis, Durham, NC (US); Richard J. Walsh, Raleigh, NC (US)

(73) Assignee: Waldeck Technology, LLC, Wilmington, DE (US)

( * ) Notice: Subject to any disclaimer, the term of this patent is extended or adjusted under 35 U.S.C. 154(b) by 362 days.

(21) Appl. No.: 12/477,275

(22) Filed: Jun. 3, 2009

(65) Prior Publication Data

US 2010/0197219 A1 Aug. 5, 2010

Related U.S. Application Data

(60) Provisional application No. 61/149,205, filed on Feb. 2, 2009.

(51) Int. Cl.
 *H04H 40/00* (2008.01)
(52) U.S. Cl. ............... 455/456.3; 455/414.1; 455/414.2; 455/456.1; 455/456.2; 455/456.6
(58) Field of Classification Search ............... 455/456.3, 455/418, 3.06, 414.1, 414.2, 456.1, 456.2, 455/456.5, 456.6; 726/18
 See application file for complete search history.

(56) References Cited

U.S. PATENT DOCUMENTS

| 5,682,525 | A | 10/1997 | Bouve et al. |
|---|---|---|---|
| 6,014,090 | A | 1/2000 | Rosen et al. |
| 6,456,234 | B1 | 9/2002 | Johnson |
| 6,606,504 | B1 | 8/2003 | Mooney et al. |
| 2003/0109288 | A1 | 6/2003 | Carley et al. |
| 2003/0143988 | A1* | 7/2003 | Jamadagni ............... 455/418 |
| 2003/0148775 | A1* | 8/2003 | Spriestersbach et al. ..... 455/456 |
| 2005/0096030 | A1 | 5/2005 | Boyd et al. |
| 2005/0249023 | A1 | 11/2005 | Bodlaender |
| 2006/0059096 | A1 | 3/2006 | Dublish et al. |
| 2006/0085383 | A1 | 4/2006 | Mantle et al. |
| 2006/0212537 | A1* | 9/2006 | Hans et al. ............... 709/217 |
| 2007/0082676 | A1 | 4/2007 | Bhogal et al. |

(Continued)

FOREIGN PATENT DOCUMENTS

WO 2009/055501 A1 4/2009

OTHER PUBLICATIONS

"Turn cell off silent remotely," post from lplplplp on Mar. 17, 2007, at <http://www.whynot.net/ideas/3546>, copyright Barry Nalebuff & Ian Ayres, printed Apr. 21, 2011, 3 pages.

(Continued)

*Primary Examiner* — Dwayne Bost
*Assistant Examiner* — William F Rideout
(74) *Attorney, Agent, or Firm* — Withrow & Terranova, PLLC

(57) ABSTRACT

Systems and methods relating to location-based applications, such as widgets, are disclosed. In general, in one embodiment, a mobile device obtains a list of applications associated with a current or anticipated location of the mobile device from a centralized or distributed application service. One or more desired applications to be activated are either manually or automatically selected from the list of applications associated with the current location or the anticipated location of the mobile device. The mobile device then activates the one or more desired applications. Optionally, for each desired application that has been activated, the desired application may be deactivated once one or more deactivation criteria are satisfied.

30 Claims, 5 Drawing Sheets

U.S. PATENT DOCUMENTS

| | | | |
|---|---|---|---|
| 2007/0219659 | A1 | 9/2007 | Abhyanker et al. |
| 2007/0233379 | A1 | 10/2007 | Bowman et al. |
| 2007/0281690 | A1 | 12/2007 | Altman et al. |
| 2008/0009327 | A1 | 1/2008 | Westwood et al. |
| 2008/0052945 | A1* | 3/2008 | Matas et al. ............ 34/173 |
| 2008/0153427 | A1 | 6/2008 | O'Shaughnessy et al. |
| 2008/0162037 | A1 | 7/2008 | Mahmoud |
| 2009/0113296 | A1 | 4/2009 | Lacy et al. |

OTHER PUBLICATIONS

"BlackBerry—New BlackBerry PDA Smartphones—New Cell Phones & Smart Phones," http://na.blackberry.com/eng/devices/, printed Aug. 17, 2009, 1 page.

"HP TouchSmart tx2 Notebook PC," http://www.hp.com/united-states/campaigns/touchsmart/notebook/index.html, copyright 2009 Hewlett-Packard Development Company, L.P, printed Aug. 17, 2009, 1 page.

"Apple—iPhone—View all the features of the new iPhone 3GS," http://www.apple.com/iphone/iphone-3gs/, printed Aug. 11, 2009, 5 pages.

"Apple—iPhone—Download thousands of iPhone applications," http://www.apple.com/iphone/apps-for-iphone/, printed Aug. 17, 2009, 2 pages.

"Apple—iPod touch—Features," http://www.apple.com/ipodtouch/features/, printed Aug. 13, 2009, 2 pages.

"Apple—MacBook—White polycarbonate 13-inch MacBook," http://www.apple.com/macbook/, printed Aug. 17, 2009, 2 pages.

Bart Sakwerda, "Concept of the time adaptable GUI for the mobile phone users," available from http://www.mobileuserexperience.com/mexdesign/200805_bart_sakwerda_student_entry.pdf, Mobile User Experience 2008 entry, printed Aug. 17, 2009, 4 pages.

"Where GPS Mobile Application, iPhone App & Location Based Services Development . . . ," http://where.com/, copyright 2008 uLocate Communications, Inc., printed Aug. 17, 2009, 2 pages.

* cited by examiner

SYSTEM AND METHOD FOR AUTOMATED LOCATION-BASED WIDGETS

RELATED APPLICATIONS

This application claims the benefit of provisional patent application Ser. No. 61/149,205, filed Feb. 2, 2009, the disclosure of which is hereby incorporated by reference in its entirety.

FIELD OF THE INVENTION

The present invention relates to location-based applications.

BACKGROUND

Mobile devices capable of executing various types of applications are becoming prolific in today's digital world. For example, the Apple® iPhone and the Apple® Application Store have resulted in tens of thousands of applications for the Apple® iPhone and Apple® iPod Touch® media player. There is a need for a system and method to quickly and easily make applications for mobile devices, such as mobile smart phones, available to relevant users.

SUMMARY

This disclosure relates to location-based applications, such as widgets. In general, in one embodiment, a mobile device obtains a list of applications associated with a current or anticipated location of the mobile device from a centralized or distributed application service. One or more desired applications to be activated are either manually or automatically selected from the list of applications associated with the current location or the anticipated location of the mobile device. The mobile device then activates the one or more desired applications. Optionally, for each desired application that has been activated, the desired application may be deactivated once one or more deactivation criteria are satisfied.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

This disclosure relates to location-based applications, which are preferably location-based widgets. As used herein, a widget is a light-weight application having relatively small storage and processing requirements that operates to provide a Graphical User Interface (GUI) component for a server-based application operating on a remote server. However, while this disclosure focuses primarily on widgets, the present invention is equally applicable to other types of applications.

Figure 1:
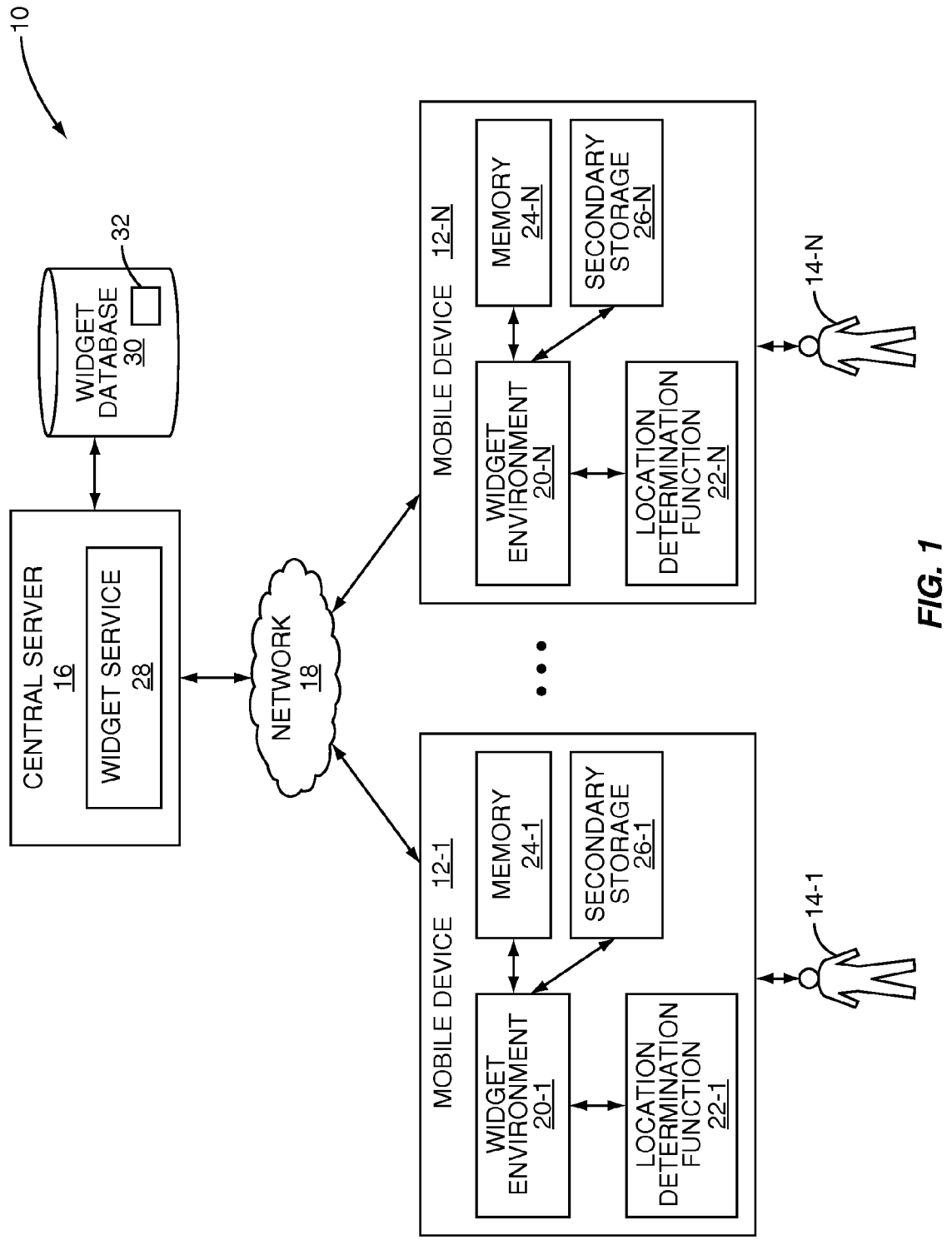
FIG. 1 illustrates a system in which location-based applications, such as location-based widgets, are implemented according to one embodiment of this disclosure.

FIG. 1 illustrates a system 10 in which location-based widgets are implemented according to one embodiment of the present invention. In general, the system 10 includes a number of mobile devices 12-1 through 12-N having associated users 14-1 through 14-N. The mobile devices 12-1 through 12-N are connected to a central server 16 via a network 18. Note that while the discussion herein focuses on the mobile devices 12-1 through 12-N, the present invention may also be utilized for stationary devices such as, for example, desktop computers. The network 18 may be any type or combination of one or more Wide Area Networks (WANs), one or more Local Area Networks (LANs), one or more Metropolitan Area Networks (MANs), or the like. For example, in one embodiment, the network 18 is the Internet where one or more of the mobile devices 12-1 through 12-N are connected to the Internet via a cellular communications network and one or more of the mobile devices 12-1 through 12-N are connected to the Internet via a local wireless connection to a wireless access node. A cellular communications network may be, for example, a 3 G, 3.5 G, or 4 G cellular communications network such as, but not limited to, a Global System for Mobile Communications (GSM) network, a Wideband Code Division Multiple Access (W-CDMA) network, a Long Term Evolution (LTE) network, a WiMAX network, or the like. A local wireless connection may be, for example, an IEEE 802.11x wireless connection.

Each of the mobile devices 12-1 through 12-N may be a mobile smart phone such as, for example, an Apple® iPhone or Blackberry® device; a portable media player such as an Apple® iPod Touch® media player; a laptop computer such as an Apple® MacBook® computer; a tablet personal computer such as an Hewlett Packard TouchSmart® tx2z tablet PC; or the like. Using the mobile device 12-1 as an example, in this embodiment, the mobile device 12-1 includes a widget environment 20-1, a location determination function 22-1, memory 24-1, and secondary storage 26-1. The widget environment 20-1 is preferably implemented in software executed by a processor of the mobile device 12-1. In general, the widget environment 20-1 generally operates to execute widgets. As discussed below, the widget environment 20-1 operates to obtain and activate widgets associated with a current location or anticipated location of the mobile device 12-1.

The location determination function 22-1 may be implemented in hardware, software, or a combination thereof. In general, the location determination function 22-1 determines a location of the mobile device 12-1. In one embodiment, the location determination function 22-1 is a Global Positioning System (GPS) receiver, and the location of the mobile device 12-1 is a pair of latitude and longitude coordinates output by the GPS receiver or a location determined based on the latitude and longitude coordinates output by the GPS receiver. For instance, using a map or database, the latitude and longitude coordinates from the GPS receiver may be converted to a street address, a postal zip code, a city or town name, a zone ID in a scenario where geographic area (e.g., world, continent, country, state, county, city or town) is divided into a number of zones, or the like. In another embodiment, the mobile device 12-1 may be connected to a cellular communications network, and the location determination function 22-1 may obtain the location of the mobile device 12-1 from the cellular communications network. In yet another embodiment, the location determination function 22-1 may enable the user 14-1 to manually enter the location of the mobile device 12-1 as, for example, a street address, a name of an establishment in which the user 14-1 is located (e.g., Home Depot, Starbucks, Raleigh/Durham International Airport, etc.), or the like. Note that the above embodiments of the location determination function 22-1 are exemplary. Any suitable mechanism or scheme for determining the location of the mobile device 12-1 such that the location of the mobile device 12-1 can be communicated to a widget service 28 may be used.

The memory 24-1 of the mobile device 12-1 may also be referred to as primary storage of the mobile device 12-1. The memory 24-1 may be, for example, Random Access Memory (RAM) such as Static RAM (SRAM) or Dynamic RAM (DRAM). Note that if the widget environment 20-1 and/or the location determination function 22-1 are implemented in software, then they are preferably stored in the memory 24-1 when being executed by a processor of the mobile device 12-1. A portion of the memory 24-1 is preferably allocated to location-based widgets activated by the widget environment 20-1 based on the current location or anticipated location of the mobile device 12-1. The amount of memory 24-1 allocated for location-based widgets may be system-defined or user-configurable. The secondary storage 26-1 may be any type of non-volatile storage such as, for example, a hard disk drive, flash memory, or the like.

In a manner similar to the mobile device 12-1, the mobile device 12-N includes a widget environment 20-N, a location determination function 22-N, memory 24-N, and secondary storage 26-N. The details of the widget environment 20-N, the location determination function 22-N, the memory 24-N, and the secondary storage 26-N are the same as discussed above with respect to the corresponding components of the mobile device 12-1. As such, these details will not be repeated.

The central server 16 is a physical server (i.e., a computer operating as a server). Note that while a single central server 16 is illustrated in FIG. 1, the functionality of the central server 16 may be distributed among two or more central servers for purposes of load sharing and/or redundancy. In this embodiment, the central server 16 hosts the widget service 28. The widget service 28 is preferably implemented in software. The widget service 28 generally maintains or otherwise has access to a widget database 30. The widget database 30 includes a widget record 32 for each of a number of widgets known to the widget service 28. The widget record 32 for a widget includes either the widget, a reference (e.g., Uniform Resource Locator (URL)) to the widget at the central server 16, or a reference to the widget at a remote server such as a server operated by a provider or producer of the widget.

In addition, the widget record 32 includes information identifying one or more areas of interest for the widget. In one embodiment, the one or more areas of interest for a widget may be defined based on latitude and longitude coordinates. For example, an area of interest for a widget may be a circular area defined by a latitude coordinate and a longitude coordinate corresponding to a center of the circular area and a distance corresponding to a radius of the circular area. In another embodiment, a geographic area such as the world, a continent, a country, a state, a county, a city or town, or the like is divided into a number of zones each having an associated zone ID, and the one or more areas of interest for the widget are defined using the zone IDs. In yet another embodiment, the one or more areas of interest may be defined using establishment names such as, for example, Home Depot, Starbucks, Raleigh/Durham International Airport, or the like. Thus, for example, if Home Depot is provided as an area of interest, the widget is associated with any Home Depot establishment regardless of physical address. In another embodiment, if the area of interest is defined by an establishment name, the area of interest may include the establishment locations (e.g., all Home Depot locations) as well areas within a predetermined distance from the establishment locations, competitor locations, or competitor locations within a predetermined distance from the establishment locations. Note that the embodiments given above for how the one or more areas of interest for a widget may be defined are exemplary and are not intended to limit the scope of the invention. Any suitable scheme for defining one or more areas of interest may be used. Note that, in an alternative embodiment, rather than storing the areas of interest in the widget record 32, a separate mapping of a number of predefined locations to associated widgets may be maintained and used to identify widgets for given locations.

The widget record 32 for the widget may also include information reflecting a popularity of the widget such as, but not limited to, a widget category for the widget (e.g., game, social networking, reference, or the like); a number of downloads of the widget or a number of downloads of the widget over a defined period of time; a user rating for the widget such as an average rating for the widget from all users that have rated the widget; and comments regarding the widget made by users. Note that the user ratings and comments may be obtained by the widget service 28 in any suitable manner. For example, the widget service 28 may include a web portal through which the users 14-1 through 14-N are enabled to rate widgets and make comments on widgets. As another example, the widget environments 20-1 through 20-N may enable the users 14-1 through 14-N to rate widgets and comment on widgets.

Before proceeding, it should be noted that the manner in which widgets are made known to the widget service 28 may vary depending on the particular implementation. In the preferred embodiment, widget providers (i.e., entities that produce widgets), register their widgets with the widget service 28. During registration of a widget, the widget provider defines one or more areas of interest for the widget. In one embodiment, the widget provider may be required to pay a fee to register the widget, pay a fee for each area of interest, or bid on desired areas of interest. The widget provider may also be enabled to select whether the widget is to be made accessible to users for free, made accessible to users for a purchase fee, or made accessible to users for a subscription fee. Users may be enabled to purchase a single widget or a defined group of widgets. Similarly, users may be enabled to subscribe to a single widget or a defined group of widgets (e.g., all widgets from a selected widget provider, all widgets in a selected widget category, or the like). Lastly, the widget provider may be enabled to define a widget category for the widget. Note that, in one embodiment, the widget service 28 may accept widgets only from trusted widget providers as determined using digital certificates or a similar authentication scheme.

Figure 2:
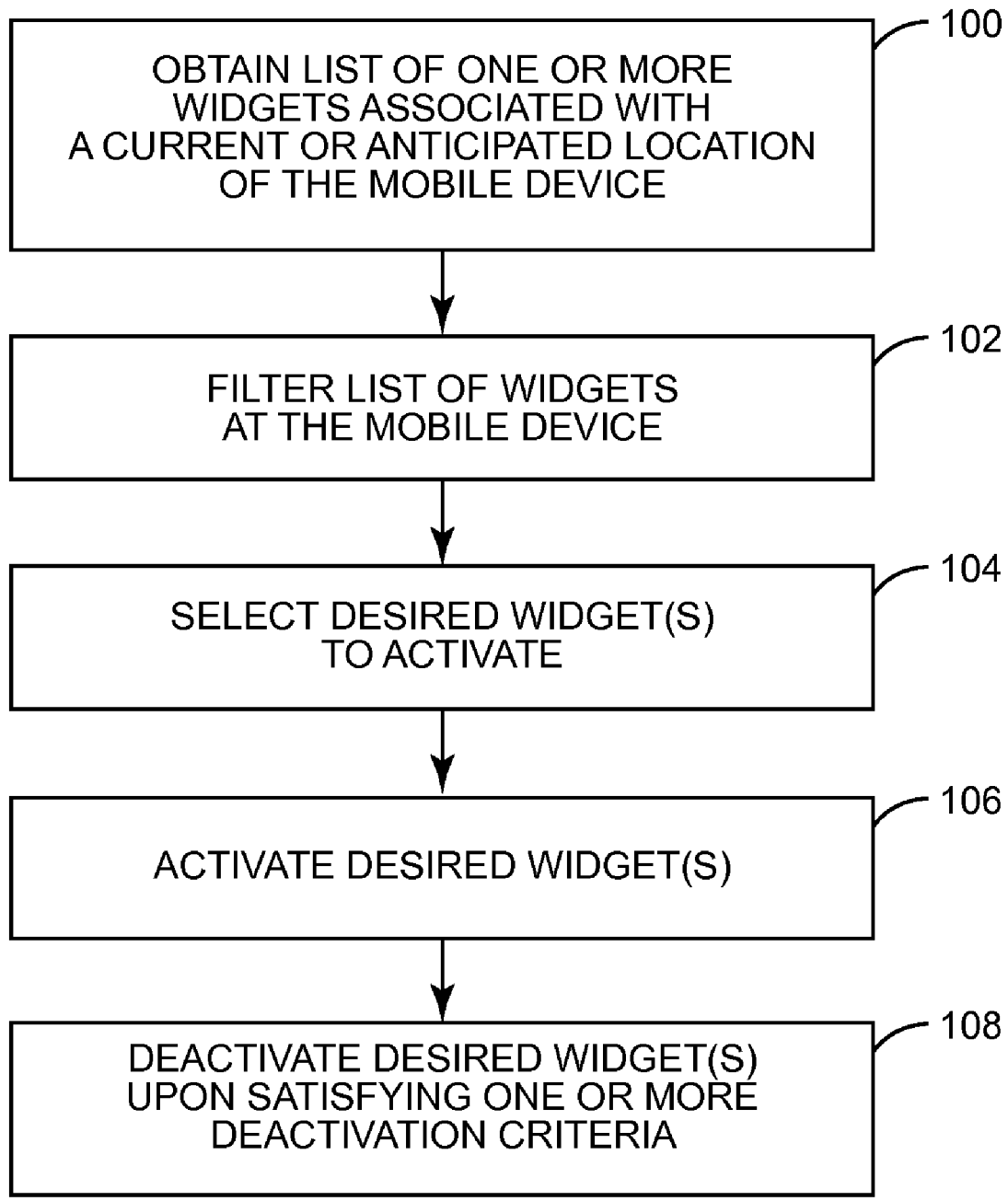
FIG. 2 is a flow chart illustrating the operation of the widget environment of one of the mobile devices to obtain and activate location-based widgets according to one embodiment of this disclosure.

FIG. 2 is a flow chart illustrating the operation of the system 10 according to one embodiment of this disclosure. Using the mobile device 12-1 as an example, first, the widget environment 20-1 obtains a list of widgets associated with a current location or an anticipated location of the mobile device 12-1 from the widget service 28 (step 100). More specifically, in one embodiment, the widget environment 20-1 obtains the current location of the mobile device 12-1 from the location determination function 22-1 and sends a request including the current location of the mobile device 12-1 to the widget service 28. The request may be sent automatically upon, for example, detecting that the location of the mobile device 12-1 has changed. Alternatively, the request may be initiated by the user 14-1. In response to receiving the request, the widget service 28 queries the widget database 30 to identify widgets associated with the current location of the mobile device 12-1. More specifically, the widget service 28 queries the widget database 30 for widgets having areas of interest that include or correspond to the current location of the mobile device 12-1.

In addition or alternatively, the widget service 28 may query the widget database 30 to identify one or more widgets associated with one or more anticipated locations of the mobile device 12-1. More specifically, the widget service 28 queries the widget database 30 for widgets having areas of interest that include or correspond to the one or more anticipated locations of the mobile device 12-1. The widget service 28 may determine the one or more anticipated locations of the mobile device 12-1 by predicting the one or more anticipated locations based on the current location of the mobile device 12-1 and historical location information for the mobile device 12-1 or the user 14-1. For instance, the widget service 28 or a third party service accessible to the widget service 28 may maintain a record of the location of the mobile device 12-1, or the user 14-1, over period of time such as over the last day, the last week, the last month, or the like. The widget service 28 may then determine one or more anticipated locations for the mobile device 12-1 based on the current location of the mobile device 12-1 and previous locations of the mobile device 12-1. For example, if the current location is near a grocery store at which the mobile device 12-1 was located at about the same time last week, the widget service 28 may identify the grocery store as an anticipated location of the mobile device 12-1. In addition or alternatively, the widget service 28 may determine the one or more anticipated locations for the mobile device 12-1 using an extrapolation based on the current location of the mobile device 12-1 and a number of immediately preceding locations of the mobile device 12-1. Still further, the widget service 28 may communicate with a calendar application or service that provides information indicating when the user 14-1 might be on a particular date and/or at a particular time.

The widget service 28 then returns a list of the one or more widgets associated with the current and/or anticipated locations of the mobile device 12-1 identified by the widget service to the widget environment 20-1 of the mobile device 12-1. In one embodiment, the widgets in the list returned to the widget environment 20-1 of the mobile device 12-1 may be ranked based on popularity. Alternatively, the list of widgets returned to the widget environment 20-1 of the mobile device 12-1 may be the M most popular widgets of the widgets identified by the widget service 28 for the current and/or anticipated locations of the mobile device 12-1, where M may, for example, be system-defined or user-configurable. In another embodiment, an auction model may be utilized wherein widget providers bid for inclusion in widget lists for desired locations and/or placement order within the widget lists. In another embodiment, the widgets in the list of widgets returned to the widget environment 20-1 of the mobile device 12-1 may include only widgets recommended by other users or entities trusted by the user 14-1. Alternatively, widgets recommended by other users or entities trusted by the user 14-1 may be prioritized within the list of widgets returned to the widget environment 20-1 of the mobile device 12-1. Trusted users or entities may be, for example, other users in a friends list or buddy list of the user 14-1, other users in a contact list of the user 14-1 maintained by the mobile device 12-1, entities (e.g., Apple, Yahoo!, etc.) identified by the user 14-1, or the like. In yet another embodiment, locations may have sponsors where widgets associated with the sponsors are given priority in the list of widgets.

In another embodiment, rather than the widget environment 20-1 sending a request to the widget service 28, the widget service 28 may broadcast the list of widgets associated with the location of the mobile device 12-1 to all of the mobile devices 12-1 through 12-N. This may be particularly beneficial in an embodiment where both the central server 16 and the mobile devices 12-1 through 12-N are associated with a LAN or WiFi hotspot. For example, if the mobile devices 12-1 through 12-N are mobile smart phones, the central server 16 may be a base station in a cellular communications network that has been provisioned with widgets appropriate for a cell of the cellular communications network served by the base station.

In yet another embodiment, rather than being hosted by the central server 16, the widget service 28 may be a distributed service. For instance, the widget service 28 may be implemented as a distributed service in a Peer-to-Peer (P2P) network formed by the mobile devices 12-1 through 12-N. In order to obtain the list of widgets associated with the current and/or anticipated locations of the mobile device 12-1, the widget environment 20-1 may query the P2P network for widgets associated with the current location of the mobile device 12-1 and/or one or more anticipated locations of the mobile device 12-1 determined by the widget environment 20-1. The results of the query obtained by the widget environment 20-1 are the list of widgets associated with the current and/or anticipated locations of the mobile device 12-1 or may be processed by the widget environment 20-1 to provide the list of widgets associated with the current and/or anticipated locations of the mobile device 12-1.

After obtaining the list of widgets associated with the location of the mobile device 12-1, the widget environment 20-1 of the mobile device 12-1 filters the list of widgets based on one or more filtering criteria (step 102). This filtering step is optional. The one or more filtering criteria may include, for example, one or more location-based criteria, one or more widget provider-based criteria, one or more user rating-based criteria, one or more file size-based criteria, one or more widget category-based criteria, one or more Digital Rights Management (DRM) criteria, one or more time-based criteria, one or more nearby device-based criteria, one or more recommendation-based criteria, one or more compatibility-based criteria, one or more user-based criteria, one or more historical usage-based criteria, or the like, or any combination thereof.

A location-based criterion is a filtering criterion based on the current location of the mobile device 12-1. For example, a location-based criterion may be that no widgets from a particular widget provider or from a particular widget category are to be provided while the user 14-1 is at work. A widget provider-based criterion is a filtering criterion defined based on one or more widget providers. For example, a widget provider-based criterion may be widgets from a particular widget provider are not allowed or that only widgets from a particular widget provider are allowed. A user rating-based criterion is a filtering criterion defined based on user ratings. For example, a user rating-based criterion may be that widgets having an average user rating less than 3 out of 5 stars are not allowed or that only widgets having an average user rating greater than or equal to 3 out of 5 stars are allowed.

A file size criterion is a filtering criterion based on a file size of the widgets. For example, a file size criterion may be that only widgets having file sizes less than 2 Megabytes (MB) are allowed. A widget category criterion is a filtering criterion defined based on widget category. For example, a widget category criterion may be that only widgets from a particular widget category are allowed or that widgets from a particular widget category are not allowed. A DRM criterion is a filtering criterion based on DRM. For example, a DRM criterion may be that only widgets that are DRM free or for which the user 14-1 has acquired access rights are allowed or that DRM restricted widgets to which the user 14-1 has not acquired rights are not allowed. A time-based criterion is a filtering criterion based on the time of day, day of the week, month of the year, or the like. For example, a time-based criterion may be that widgets are not allowed during the hours of 11 p.m. to 6 a.m. or that widgets from a particular widget provider or widget category are not allowed on Monday through Friday from 8 a.m. to 6 p.m.

A nearby device-based criterion is a filtering criterion based on devices that are required to be located near or are required to not be near the mobile device 12-1. For example, a nearby device-based criterion may be that widgets from a particular widget category are not allowed when the mobile device 12-2 or the mobile device 12-3 is near the mobile device 12-1. As another example, a nearby device-based criterion may be that widgets from a particular widget provider are to be allowed only when the mobile device 12-2 and the mobile device 12-3 are near the mobile device 12-1. As used herein, a "nearby device" of the mobile device 12-1 is another device, such as another one of the mobile devices 12-2 through 12-N, that is within a local wireless communication range of the mobile device 12-1 (e.g., within range of an IEEE 802.11x transceiver of the mobile device 12-1) or within a predetermined distance (e.g., less than 500 feet) from the mobile device 12-1 as determined by the current locations of the mobile device 12-1 and the other device.

A recommendation-based criterion is a filtering criterion based on recommendations from trusted users or entities. For example, a recommendation-based criterion may be that only widgets recommended by one or more trusted users or entities are to be allowed. As another example, a recommendation-based criterion may be that only widgets from widget providers recommended by one or more trusted users or entities are to be allowed.

A compatibility-based criterion is a filtering criterion based on whether a widget is compatible with the mobile device 12-1 or the widget environment 20-1. For example, a compatibility-based widget may be that only widgets that are compatible with the mobile device 12-1 and/or the widget environment 20-1 are allowed. A user-based criterion is a filtering criterion based on the user 14-1 of the mobile device 12-1. For example, a user-based criterion may be that certain widgets or widget categories are not to be allowed if the user 14-1 is under the age of 16 years old. A historical usage-based criterion is a filtering criterion based on historical usage of widgets or selection of widgets by the user 14-1 or the mobile device 12-1. For example, if a historical usage-based criterion may state that if a widget was previously selected by the user 14-1 at a particular location, then that widget is allowed.

Once the list of widgets is filtered, one or more desired widgets to activate are selected from the filtered list of widgets (step 104). In one embodiment, the selection of the one or more desired widgets to activate is automatically performed by the widget environment 20-1. For example, the widget environment 20-1 may automatically select all widgets in the filtered list of widgets as desired widgets to activate. In another embodiment, the widget environment 20-1 may select the desired widgets to activate based on explicit user preferences defined by the user 14-1 or implicit user preferences determined by the widget environment 20-1 based on previous activities of the user 14-1. The explicit or implicit preferences of the user 14-1 may be associated with the current and/or anticipated location of the mobile device 12-1. In another embodiment, the widget environment 20-1 presents the filtered list of widgets to the user 14-1, and the user 14-1 manually selects one or more desired widgets from the filtered list of widgets to be activated.

In addition or alternatively, in one embodiment, the widget environment 20-1 may automatically select official or preferred widget(s) for the current location or anticipated location of the mobile device 12-1. For example, if the current location of the mobile device 12-1 is Home Depot and Home Depot has an official widget or preferred widget, the official or preferred widget may be marked as such within the list of widgets obtained by the widget environment 20-1, and the widget environment 20-1 may automatically select the official or preferred widget to be activated. Still further, in one embodiment, the widget service 28 may identify widgets recommended by the widget service 28 or widgets that the widget service 28 requests to be activated. As such, the widget environment 20-1 may automatically select such widgets for activation.

Once the one or more desired widgets to be activated are selected, the widget environment 20-1 activates the one or more desired widgets (step 106). The manner in which the one or more desired widgets are activated may vary depending on the particular implementation. First, for each desired widget to activate, the widget environment 20-1 determines whether the desired widget needs to be obtained from the widget service 28. More specifically, the widget environment 20-1 determines whether the desired widget is already stored at the mobile device 12-1 in either the memory 24-1 or the secondary storage 26-1. In addition, if the desired widget is already stored at the mobile device 12-1, the mobile device 12-1 may determine if the widget has been modified since the widget was obtained and stored at the mobile device 12-1. If the widget is already stored at the mobile device 12-1 and, optionally, if the widget does not need to be updated, in one embodiment, the widget environment 20-1 loads the desired widget into the memory 24-1 if the desired widget is not already stored in the memory 24-1.

In some embodiments, once a widget is deactivated, the widget environment 20-1 may remove the widget from the memory 24-1 and store a backup copy of the widget in remote storage such as storage at a network node within the network 18, storage of another one of the mobile devices 12-2 through 12-N, or another device of the user 14-1 such as a personal computer of the user 14-1. In this case, if the desired widget is not already stored at the mobile device 12-1, the widget environment 20-1 may also determine whether the desired widget has previously been remotely backed-up.

If the desired widget is not already stored at the mobile device 12-1 and has not been remotely backed-up, the widget environment 20-1 determines that the desired widget needs to be obtained from the widget service 28. The widget environment 20-1 may also determine that the desired widget needs to be obtained from the widget service 28 if the desired widget is already stored at the mobile device 12-1 or remotely backed-up but needs to be updated. As such, the widget environment 20-1 sends a request to the widget service 28 for the desired widget. In response, the widget service 28 returns either the desired widget or a reference to the desired widget to the widget environment 20-1 of the mobile device 12-1. Note that the widget service 28 may perform rights management. If so, the widget service 28 may determine whether the mobile device 12-1 or the user 14-1 of the mobile device 12-1 has been granted access rights to the desired widget before returning either the desired widget or the reference to the desired widget to the widget environment 20-1 of the mobile device 12-1. If the widget service 28 returns the desired widget, the desired widget is either loaded in the memory 24-1 or stored in the secondary storage 26-1. If the widget service 28 returns a reference to the desired widget, the widget environment 20-1 then requests and receives the desired widget from a remote server hosting the desired widget using the reference returned by the widget service 28 and then either loads the desired widget into the memory 24-1 or stores the desired widget in the secondary storage 26-1. Note that, in an alternative embodiment, the reference to the widget may be included in the list of widgets obtained in step 100.

If the desired widget is not already stored at the mobile device 12-1 and has been remotely backed-up, the widget environment 20-1 obtains the desired widget from backup. If for some reason the desired widget is unavailable from backup, the widget environment 20-1 may operate as described above to obtain the desired widget from the widget service 28. The desired widget is then either loaded into the memory 24-1 or stored in the secondary storage 26-1.

In addition, in order to activate the one or more desired widgets, the widget environment 28 may perform one or more additional operations. For each desired widget, the one or more additional operations may include displaying a GUI element representative of the desired widget that may be selected by the user 14-1 to run the desired widget, emphasizing the GUI element representative of the desired widget, automatically initiating execution of the desired widget, restoring a state of the desired widget if the desired widget has been previously executed at the mobile device 12-1, de-emphasizing GUI elements representative of widgets other than the one or more desired widgets, preventing or pausing execution of widgets other than the one or more desired widgets, or any combination thereof. In one embodiment, once the one or more desired widgets are activated, the widget environment 20-1 may alert the user 14-1.

After the one or more desired widgets are activated, for each desired widget that has been activated, the widget environment 20-1 monitors one or more parameters to determine whether one or more deactivation criteria for the desired widget have been satisfied. The deactivation criteria for the desired widget may be provided to the widget environment 20-1 by the widget service 28 in association with the desired widget, be included in a license issued to the mobile device 12-1 or the user 14-1 for the desired widget by the widget service 28 or a license server, or the like. Alternatively, the deactivation criteria may be the same predefined deactivation criteria for all widgets from the widget service 28 where the predefined deactivation criteria is known to the widget environment 20-1.

For each desired widget, once the one or more deactivation criteria have been satisfied, the widget environment deactivates the desired widget (step 108). Note that step 108 is optional. For a widget, the deactivation criteria may include one or more location-based criteria, one or more time-based criteria, one or more residual rights-based criteria, one or more nearby device-based criteria, one or more user-based criteria, or a combination thereof. For example, in one embodiment, the deactivation criterion for one of the desired widgets is that the desired widget is to be deactivated when the mobile device 12-1 is no longer located within the area of interest of the desired widget. As such, the widget environment 20-1 may obtain the area of interest for the desired widget from the widget service 28 and monitor the current location of the mobile device 12-1 to determine when the mobile device 12-1 leaves the area of interest of the desired widget. Alternatively, the widget environment 20-1 may periodically provide the current location of the mobile device 12-1 to the widget service 28, and the widget service 28 may either explicitly notify the widget environment 20-1 when the mobile device 12-1 is no longer in the area of interest of the desired widget or implicitly notify the widget environment 20-1 when the mobile device 12-1 is no longer in the area of interest of the desired widget (e.g., the list of widgets associated with the current location of the mobile device 12-1 no longer includes the desired widget).

As another example, the deactivation criteria for one of the desired widgets may include a criterion that the desired widget is to be deactivated when the mobile device 12-1 is more than 0.5 miles outside of the area of interest of the desired widget. As a yet another example, the deactivation criteria for one of the desired widgets may include a criterion that the desired widget is to be deactivated a defined amount of time after activation or deactivated a defined amount of time after the mobile device 12-1 has left the area of interest of the desired widget.

As for residual rights, the user 14-1 may be granted residual rights that allow the user 14-1 to use one of the desired widgets after other deactivation criteria have been met (e.g., the mobile device 12-1 is no longer in the area of interest of the desired widget). Residual rights may be granted for any desired reason such as, for example, the performance of one or more predefined actions by the user 14-1. The one or more predefined actions may be, for example, the purchase of goods or services. The residual rights may be that the user 14-1 is enabled to use the desired widget for an additional amount of time (e.g., one hour, one day, or the like). Thus, residual rights-based criteria may state that the desired widget is to be deactivated only after one or more other deactivation criteria have been satisfied and any residual rights have expired. It should be noted that the desired widgets may each have the same deactivation criteria. Alternatively, the deactivation criteria for the desired widgets may be independently defined.

As for one or more nearby device-based criteria, the deactivation criteria for one of the desired widgets may include a criterion that the desired widget is to be deactivated when the mobile device 12-1 is nearby one or more defined devices (e.g., one or more of the other mobile devices 12-2 through 12-N) or is no longer nearby one or more defined devices (e.g., one or more of the other mobile devices 12-2 through 12-N). As for the one or more user-based criteria, the deactivation criteria for one of the desired widgets may include a criterion that that desired widget is to be deactivated if a new user under a defined age begins using the mobile device 12-1.

The manner in which the one or more desired widgets are deactivated may vary depending on the particular implementation. Deactivation of a widget includes stopping (i.e., terminating or pausing) execution of the widget. In addition, execution of the widget may be prevented until the widget is again activated. Deactivation of a widget may also include one or more additional processes such as removing the widget from the memory 24-1, marking the widget for deletion from the memory 24-1, storing the widget in the secondary storage 26-1, backing up the widget and a state of the widget in a remote storage device, backing up the widget in a remote storage device while storing the state of the widget either in the memory 24-1 or the secondary storage 26-1 of the mobile device 12-1, removing a GUI element representing the widget, de-emphasizing a GUI element representing the widget, emphasizing GUI elements representing widgets other than the widget, enabling other widgets to execute or resume execution, starting execution of another widget such as a default widget, or any combination thereof. With respect to backup of the widget at a remote storage device, the remote storage device may be a remote server, a component of a network of devices (e.g., a P2P network or a Distributed Hash Table (DHT)), or another device associated with the user 14-1 such as a personal computer located at the user's home.

The widget environment 20-1 may also perform a memory management function. More specifically, in one embodiment, an amount of the memory 24-1 is allocated for location-based widgets. The widget environment 20-1 may manage the allocated memory 24-1 using any desired memory management scheme such as First-In-First-Out (FIFO), Least Recently Used (LRU), or the like. Memory management would be most beneficial in embodiments where there is no deactivation step 108 or where the deactivation of widgets in step 108 does not include removing the widgets from the memory 24-1.

Figure 3:
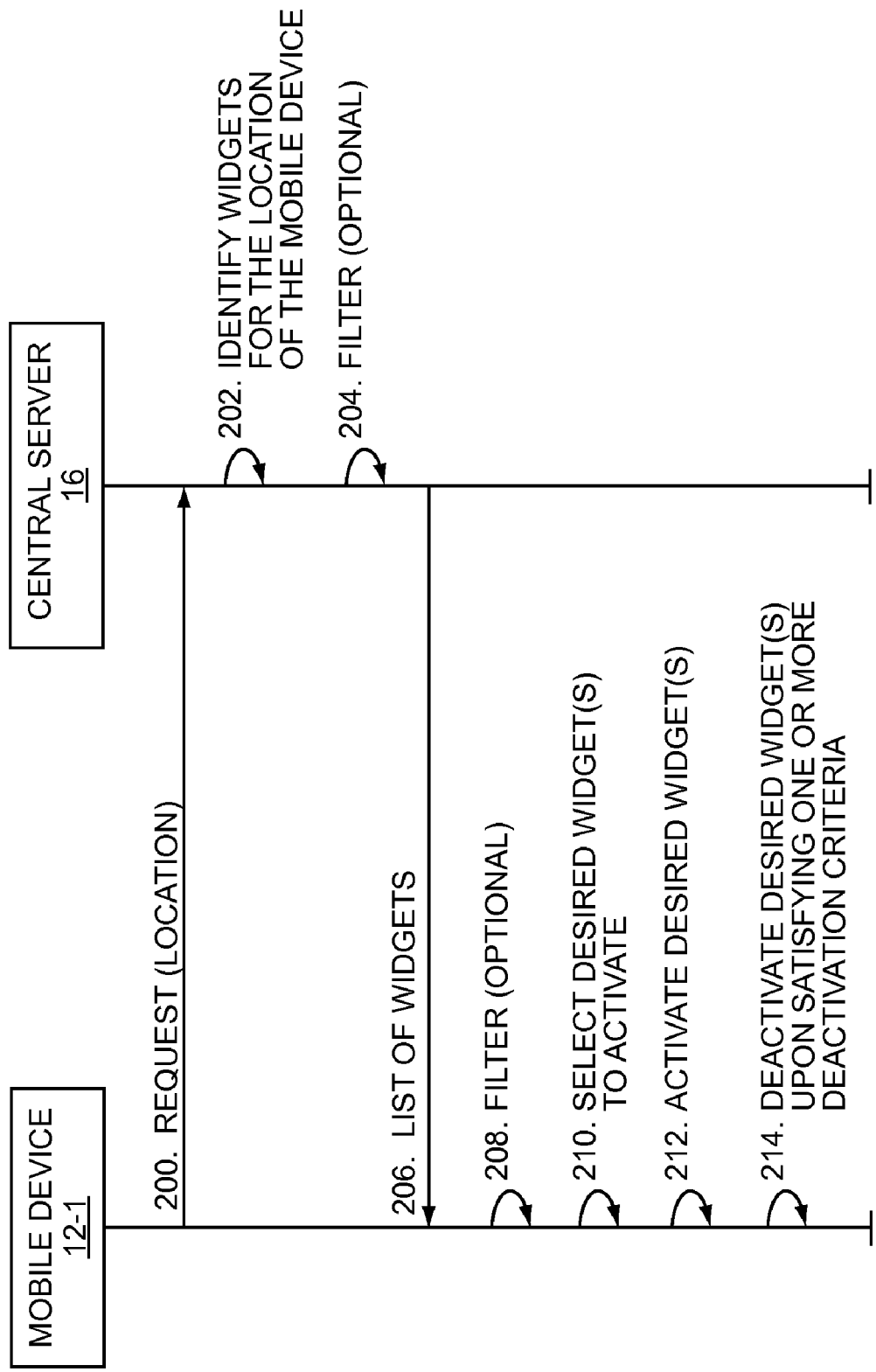
FIG. 3 illustrates the operation of the system of FIG. 1 according to one embodiment of this disclosure.

FIG. 3 illustrates the operation of the system 10 of FIG. 1 according to one embodiment of this disclosure. As illustrated, the widget environment 20-1 of the mobile device 12-1 first sends a request including the current location of the mobile device 12-1 to the widget service 28, which in this embodiment is hosted by the central server 16 (step 200). In an alternative embodiment, the request may not include the current location of the mobile device 12-1. Instead, the current location and, optionally, past locations of the mobile device 12-1 may be maintained by a remote location service that is accessible to the widget service 28. In this case, the user 14-1 may be required to grant the widget service 28 rights to access the location information for the mobile device 12-1 from the location service. The user 14-1 may grant the widget service 28 rights to access the location information by, for example, providing a password to the widget service 28 that is needed to access the location information at the location service.

In response to the request, the widget service 28 of the central server 16 identifies widgets for the current location and/or one or more anticipated locations of the mobile device 12-1 based on the current location of the mobile device 12-1 provided in the request (step 202). Optionally, the widget service 28 may filter the identified widgets based on one or more filtering criteria (step 204). The one or more filtering criteria may include one or more trusted source-based criteria, one or more popularity-based criteria, one or more recommendation-based criteria, one or more fee-based criteria, or the like, or any combination thereof. For example, the one or more trusted source criteria may be that widgets from only one or more trusted widget providers are allowed. The one or more trusted widget providers may be identified by the user 14-1 of the mobile device 12-1. The one or more popularity-based criteria may be that only widgets having a popularity (e.g., number of downloads or number of downloads over a predetermined amount of time) are allowed. Alternatively, popularity may be used to prioritize the widgets in the list of widgets to be provided to the widget environment 20-1 of the mobile device 12-1. The one or more recommendation-based criteria may be that only widgets recommended by other users or entities trusted by the user 14-1 are allowed. The trusted users may be other users in a buddy list of the user 14-1, other users in a contact list of the user 14-1 stored in the mobile device 12-1, or the like. Trusted entities may be identified by the user 14-1. Lastly, the one or more fee-based criteria may be that only widgets that are free or for which the user 14-1 has paid a purchase or subscription fee are allowed.

Next, the widget service 28 of the central server 16 provides a list of widgets for the current location and/or one or more anticipated locations of the mobile device 12-1 to the widget environment 20-1 of the mobile device 12-1 (step 206). If the filtering step 204 is performed, the list of widgets is a list of widgets resulting from the filtering step 204. If the filtering step 204 is not performed, the list of widgets is a list of the widgets identified in step 202.

Optionally, upon receiving the list of widgets, the widget environment 20-1 of the mobile device 12-1 filters the list of widgets as discussed above (step 208). Next, the widget environment 20-1 of the mobile device 12-1 automatically selects one or more desired widgets to be activated or enables the user 14-1 to manually select one or more desired widgets to be activated (step 210). The widget environment 20-1 of the mobile device 12-1 then activates the one or more desired widgets (step 212). Thereafter, for each of the desired widgets that has been activated, the widget environment 20-1 monitors one or more parameters and deactivates the desired widget when one or more deactivation criteria are satisfied (step 214).

Figure 4:
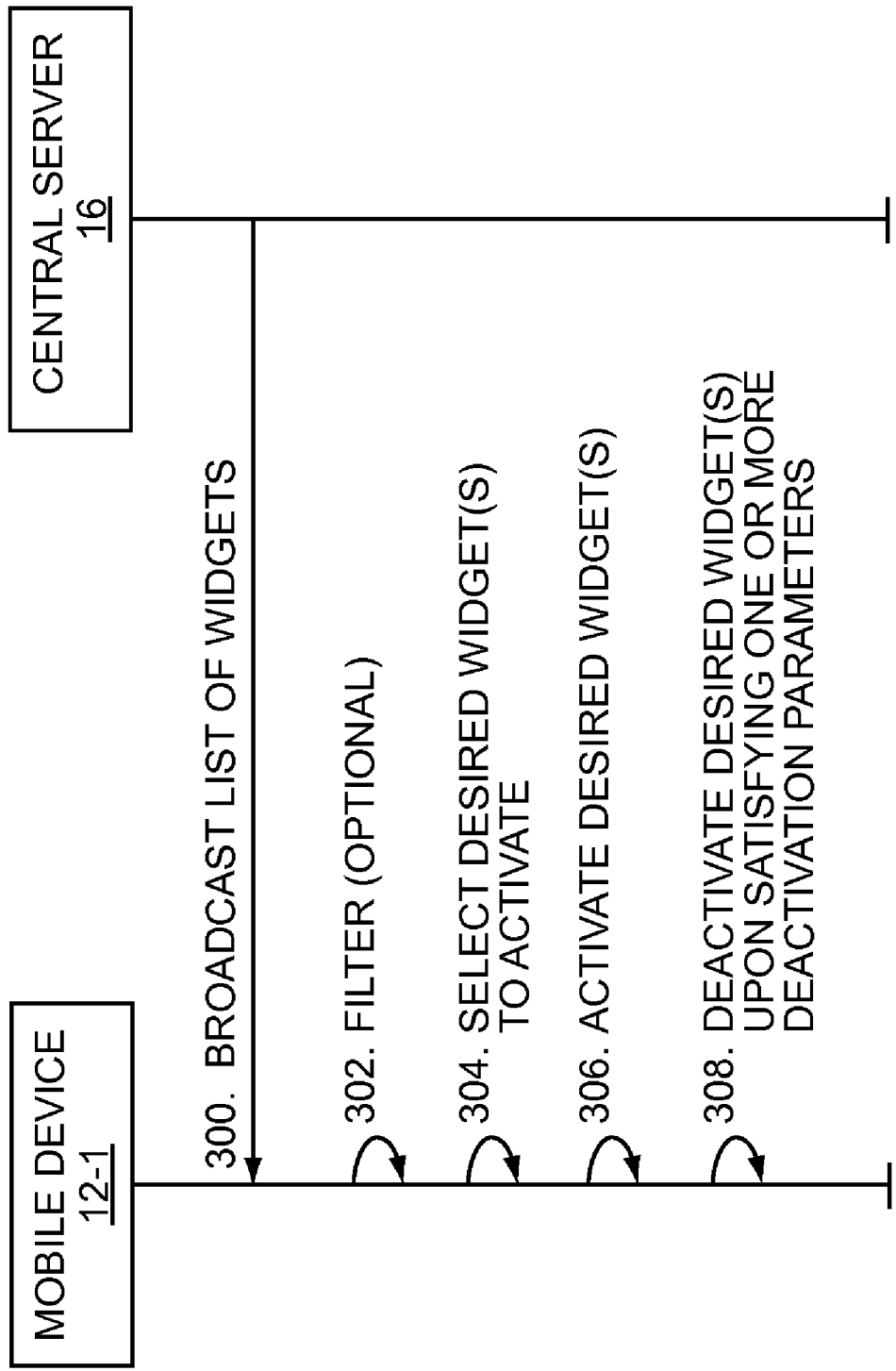
FIG. 4 illustrates the operation of the system of FIG. 1 according to another embodiment of this disclosure.

FIG. 4 illustrates the operation of the system 10 of FIG. 1 according to another embodiment of this disclosure. As illustrated, the widget service 28, which in this embodiment is hosted by the central server 16, broadcasts a list of widgets associated with the current location of the mobile device 12-1 (step 300). Alternatively, the widget service 28 may broadcast a list of all widgets and their areas of interest, where the widget environment 20-1 of the mobile device 12-1 then identifies a list of widgets associated with the current location of the mobile device 12-1 and/or one or more anticipated locations of the mobile device 12-1 from the list of widgets broadcast by the widget service 28.

Optionally, upon receiving the list of widgets, the widget environment 20-1 of the mobile device 12-1 filters the list of widgets as discussed above (step 302). Next, the widget environment 20-1 of the mobile device 12-1 automatically selects one or more desired widgets to be activated or enables the user 14-1 to manually select one or more desired widgets to be activated (step 304). The widget environment 20-1 of the mobile device 12-1 then activates the one or more desired widgets (step 306). Thereafter, for each of the desired widgets that has been activated, the widget environment 20-1 monitors one or more parameters and deactivates the desired widget when one or more deactivation criteria are satisfied (step 308).

Figure 5:
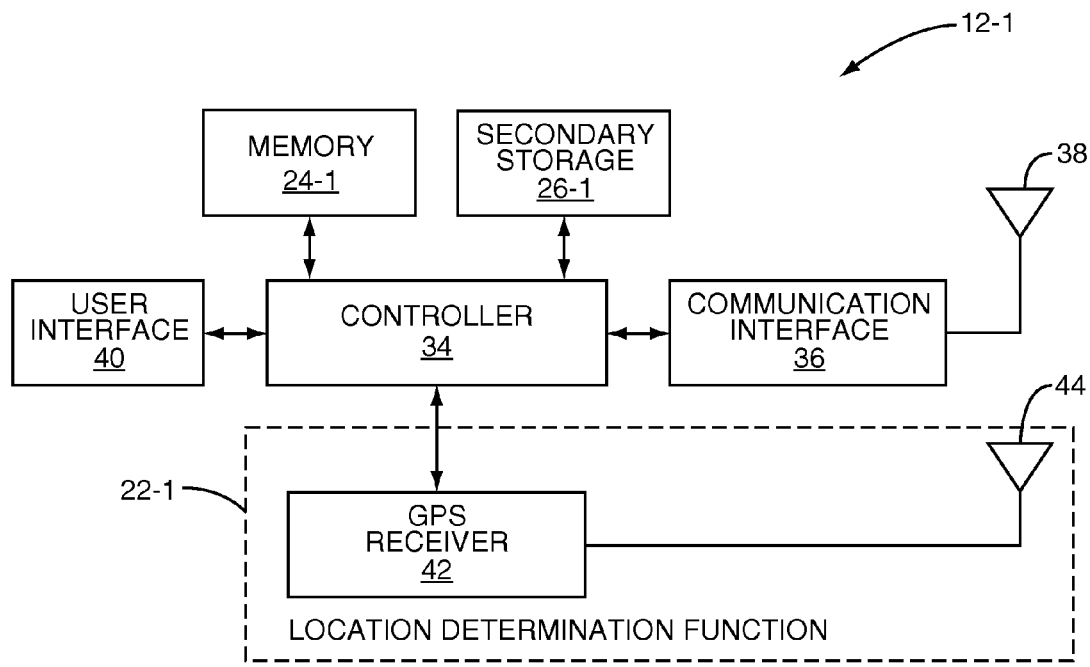
FIG. 5 is a block diagram of one of the mobile devices of FIG. 1 according to one embodiment of this disclosure.

FIG. 5 is a block diagram of the mobile device 12-1 of FIG. 1 according to one embodiment of this disclosure. This discussion is equally applicable to the other mobile devices 12-2 through 12-N. In general, the mobile device 12-1 includes a controller 34 associated with the memory 24-1. The controller 34 may be any type of digital processor such as, but not limited to, a Central Processing Unit (CPU), an Application Specific Integrated Circuit (ASIC), a Field Programmable Gate Array (FPGA), or the like. In one embodiment, the widget environment 20-1 (FIG. 1) is implemented in software, stored in the memory 24-1, and executed by the controller 34 in order to operate as described above. In addition, a portion of the memory 24-1 is allocated for location-based widgets as described above. In this embodiment, the mobile device 12-1 also includes the secondary storage 26-1. The secondary storage 26-1 may be used to, for example, store location-based widgets after the location-based widgets have been purged from the memory 24-1.

The mobile device 12-1 also includes a communication interface 36 enabling the mobile device 12-1 to connect to the network 18 (FIG. 1). The communication interface 36 is a physical component and is connected to an associated antenna 38. However, the details of the communication interface 36 may vary depending on the particular embodiment. For example, in one embodiment, the communication interface 36 is a Network Interface Card (NIC) providing local wireless connectivity (e.g., a IEEE 802.11x wireless connection or the like). In another embodiment, the communication interface 36 is a cellular communications interface such as, for example, a 3 G, a 3.5 G, or a 4 G cellular communications interface such as, but not limited to, a GSM interface, a W-CDMA interface, a WiMAX interface, an LTE interface, or the like.

The mobile device 12-1 also includes a user interface 40. The user interface 40 includes one or more user input devices such as a touch screen, a keypad, a keyboard, a mouse, a microphone, or the like. In addition, the user interface 40 includes one or more output devices such as a display, a speaker, or the like. Lastly, in this embodiment, the mobile device 12-1 includes the location determination function 22-1. In this embodiment, the location determination function 22-1 is a GPS receiver 42 having an associated antenna 44.

Figure 6:
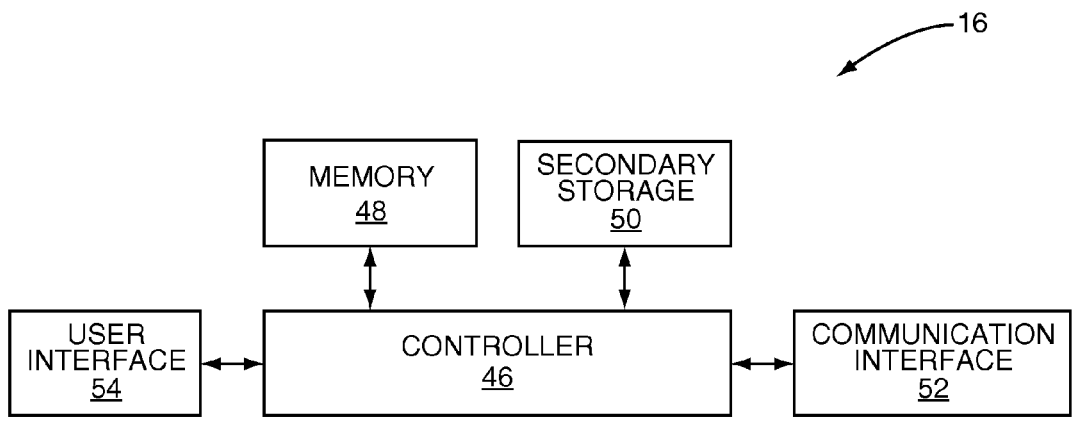
FIG. 6 is a block diagram of the central server of FIG. 1 according to one embodiment of this disclosure.

FIG. 6 is a block diagram of the central server 16 of FIG. 1 according to one embodiment of this disclosure. In general, the central server 16 includes a controller 46 having associated memory 48. The controller 46 may be any type of digital processor such as, but not limited to, a CPU, an ASIC, a FPGA, or the like. The memory 48 may be RAM or the like. The central server 16 may also include secondary storage 50 such as, for example, flash memory, Read Only Memory (ROM), one or more magnetic hard disk drives, one or more optical storage devices, or the like. In one embodiment, the widget service 28 (FIG. 1) is stored in the memory 48 and executed by the controller 46 in order to operate as described above. The widget database 30 may be stored in the secondary storage 50.

The central server 16 also includes a communication interface 52 enabling the central server 16 to connect to the network 18 (FIG. 1). The communication interface 52 is a physical component. However, the details of the communication interface 52 may vary depending on the particular embodiment. For example, in one embodiment, the communication interface 52 is a NIC providing Ethernet connectivity, wireless IEEE 802.11x connectivity, or the like. In another embodiment, the communication interface 52 is a cellular communications interface such as, for example, a 3 G, a 3.5 G, or a 4 G cellular communications interface such as, but not limited to, a GSM interface, a W-CDMA interface, a WiMAX interface, an LTE interface, or the like. Lastly, the central server 16 may include a user interface 54. The user interface 54 may include one or more user input devices such as a touch screen, a keypad, a keyboard, a mouse, a microphone, or the like. In addition, the user interface 54 may include one or more output devices such as a display, a speaker, or the like.

Those skilled in the art will recognize improvements and modifications to the preferred embodiments of the present invention. All such improvements and modifications are considered within the scope of the concepts disclosed herein and the claims that follow.

What is claimed is:

1. A mobile device comprising:
   a communication interface communicatively coupling the mobile device to an application service; and
   a control system associated with the communication interface and adapted to:
   obtain, from the application service, a list of applications associated with at least one of the group consisting of: a current location of the mobile device and one or more anticipated locations of the mobile device, wherein one of the current location or the one or more anticipated locations comprises an establishment;
   identify one or more desired applications to be activated from the list of applications; and
   activate the one or more desired applications
   wherein in order to activate the one or more desired applications, the control system is adapted to, for each desired application of the one or more desired applications:
   determine whether the desired application needs to be obtained from the application service; and
   if the desired application needs to be obtained from the application service, obtain one of the group consisting of the desired application and a reference to the desired application from the application service.

2. The mobile device of claim 1 wherein the application service is a widget service, the list of applications is a list of widgets, and the one or more desired applications to be activated are one or more desired widgets from the list of widgets.

3. The mobile device of claim 1 wherein the control system obtains the reference to the desired application from the application service, and in order to activate the desired application, the control system is further adapted to obtain the desired application from a remote source using the reference to the desired application obtained from the applicat on service.

4. The mobile device of claim 1 wherein in order to activate the one or more desired applications, the control system is further adapted to, for each desired application of the one or more desired applications perform at least one operation of the group consisting of: display a Graphical User Interface (GUI) element representative of the desired application that may be selected by a user of the mobile device to run the desired application, emphasize a GUI element representative of the desired application, automatically initiate execution of the desired application, restore a state of the desired application if the desired application has been previously executed at the mobile device, de-emphasize GUI elements representative of other applications, prevent execution of other applications, and pause execution of other applications.

5. The mobile device of claim 1 wherein in order to activate the one or more desired applications, the control system is further adapted to automatically load the one or more desired applications into memory at the mobile device.

6. The mobile device of claim 1 wherein the control system is further adapted to, for each desired application of the one or more desired applications that have been activated, deactivate the desired application upon determining that one or more deactivation criteria for the desired application have been satisfied.

7. The mobile device of claim 6 wherein the one or more deactivation criteria comprises a criterion selected from the group consisting of: a criterion that the desired application is to be deactivated when the mobile device leaves an area of interest of the desired application and a criterion that the desired application is to be deactivated when the mobile device is more than a predefined distance outside the area of interest of the desired application.

8. The mobile device of claim 6 wherein the one or more deactivation criteria comprises a criterion that the desired application is to be deactivated after a predefined amount of time has expired since the desired application was activated.

9. The mobile device of claim 6 wherein the one or more deactivation criteria comprises a criterion that the desired application is to be deactivated after a predefined amount of time has expired since the occurrence of an event selected from the group consisting of: the mobile device leaving an area of interest of the desired application and the mobile device being more than a predefined distance from the area of interest of the desired application.

10. The mobile device of claim 6 wherein the one or more deactivation criteria comprises a criterion that the desired application is to be deactivated after expiration of residual rights.

11. The mobile device of claim 6 wherein the one or more deactivation criteria for the desired application are defined by a license provided to the mobile device in association with the desired application.

12. The mobile device of claim 6 wherein the one or more deactivation criteria for the desired application are independently defined for each of the one or more desired applications.

13. The mobile device of claim 6 wherein the one or more deactivation criteria for the desired application are the same for each of the one or more desired applications.

14. The mobile device of claim 6 wherein, for each desired application of the one or more desired applications, in order to deactivate the desired application, the control system is adapted to stop execution of the desired application if the desired application is executing.

15. The mobile device of claim 14 wherein, for each desired application of the one or more desired applications, in order to deactivate the desired application, the control system is further adapted to prevent execution of the desired application.

16. The mobile device of claim 14 wherein, for each desired application of the one or more desired applications, in order to deactivate the desired application, the control system is further adapted to remove the desired application from memory of the mobile device.

17. The mobile device of claim 16 wherein, for each desired application of the one or more desired applications, in order to deactivate the desired application, the control system is further adapted to perform one or more operations selected from the group consisting of: store the desired application in secondary storage of the mobile device, backup the desired application and a state of the desired application to a remote storage device, and backup the desired application to a remote storage device while storing a state of the desired application at the mobile device.

18. The mobile device of claim 14 wherein, for each desired application of the one or more desired applications, in order to deactivate the desired application, the control system is further adapted to perform one or more additional operations selected from the group consisting of: remove a Graphical User Interface (GUI) element representing the desired application from a GUI of the mobile device, de-emphasize a GUI element representing the desired application in a GUI of the mobile device, and emphasizing GUI elements representing other applications in a GUI of the mobile device.

19. The mobile device of claim 14 wherein, for each desired application of the one or more desired applications, in order to deactivate the desired application, the control system is further adapted to perform one or more additional operations selected from a group consisting of: enable other applications to execute or resume execution at the mobile device and initiate execution of another application at the mobile device.

20. The mobile device of claim 1 wherein in order to identify the one or more desired applications to be activated, the control system is adapted to automatically select the one or more desired applications from the list of applications.

21. The mobile device of claim 1 wherein in order to identify the one or more desired applications to be activated, the control system is adapted to enable a user of the mobile device to manually select the one or more desired applications from the list of applications.

22. The mobile device of claim 1 wherein the control system is further adapted to filter the list of applications based on one or more filtering criteria to provide a filtered list of applications, and identify the one or more desired applications from the filtered list of applications.

23. The mobile device of claim 22 wherein the one or more filtering criteria include one or more of the group consisting of: one or more location-based filtering criteria, one or more application provider-based criteria, one or more user rating-based criteria, one or more file size-based criteria, one or more application category-based criteria, one or more Digital Rights Management (DRM) based criteria, one or more recommendation-based criteria, one or more compatibility-based criteria, and one or more user-based criteria.

24. The mobile device of claim 1 wherein in order to obtain the list of applications, the control system is further adapted to:
send a request to the application service; and
receive the list of applications from the application service in response to the request.

25. The mobile device of claim 1 wherein in order to obtain the list of applications, the control system is further adapted to receive a broadcast of the list of applications from the application service.

26. The mobile device of claim 1 wherein in order to obtain the list of applications, the control system is further adapted to:
receive a broadcast of an initial list of applications from the application service including applications associated with the one or more anticipated locations of the mobile device and further including one or more other applications; and
identify the list of applications associated with the one or more anticipated locations of the mobile device from the initial list of applications.

27. The mobile device of claim 1 wherein the application service is hosted by a central server.

28. The mobile device of claim 1 wherein the application service is hosted by a distributed network.

29. A method of operation of a mobile device comprising:
obtaining, from an application service, a list of applications associated with at least one of the group consisting of: a current location of the mobile device and one or more anticipated locations of the mobile device, wherein one of the current location or the one or more anticipated locations comprises an establishment;

identifying one or more desired applications to be activated from the list of applications; and activating the one or more desired applications wherein in order to activate the one or more desired applications, the control system is adapted to, for each desired application of the one or more desired applications:

determine whether the desired application needs to be obtained from the application service; and if the desired application needs to be obtained from the application service, obtain one of the group consisting of the desired application and a reference to the desired application from the application service.

30. A non-transitory computer readable medium storing software for instructing a processor of a mobile device to:

obtain, from an application service, a list of applications associated with at least one of the group consisting of: a current location of the mobile device and one or more anticipated locations of the mobile device, wherein one of the current location or the one or more anticipated locations comprises an establishment;

identify one or more desired applications to be activated from the list of applications; and activate the one or more desired applications wherein in order to activate the one or more desired applications, the control system is adapted to, for each desired application of the one or more desired applications:

determine whether the desired application needs to be obtained from the application service; and if the desired application needs to be obtained from the application service, obtain one of the group consisting of the desired application and a reference to the desired application from the application service.

* * * * *